United States Patent
Yang

(10) Patent No.: US 10,216,944 B2
(45) Date of Patent: Feb. 26, 2019

(54) METHOD FOR EXECUTING ACCESS CONTROL OVER ELECTRONIC DEVICE AND ELECTRONIC DEVICE CAPABLE OF EXECUTING ACCESS CONTROL

(71) Applicant: GETAC TECHNOLOGY CORPORATION, Hsinchu County (TW)

(72) Inventor: Chih-Yu Yang, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 148 days.

(21) Appl. No.: 15/081,412

(22) Filed: Mar. 25, 2016

(65) Prior Publication Data

US 2017/0277899 A1 Sep. 28, 2017

(51) Int. Cl.
| | | |
|---|---|---|
| *G06F 7/04* | (2006.01) | |
| *H04L 29/06* | (2006.01) | |
| *H04L 9/32* | (2006.01) | |
| *G06F 21/60* | (2013.01) | |
| *G06F 21/62* | (2013.01) | |

(52) U.S. Cl.
CPC .......... *G06F 21/604* (2013.01); *G06F 21/629* (2013.01); *G06F 21/6218* (2013.01); *G06F 2221/2111* (2013.01); *G06F 2221/2141* (2013.01); *G06F 2221/2149* (2013.01)

(58) Field of Classification Search
CPC .. G06F 21/604; G06F 21/629; G06F 21/6218; G06F 2221/2141; G06F 2221/2149; G06F 2221/2111

USPC ...................... 726/17, 1, 4, 27; 713/165, 168
See application file for complete search history.

(56) References Cited

U.S. PATENT DOCUMENTS

| | | | | |
|---|---|---|---|---|
| 7,945,586 | B1 * | 5/2011 | Fang ................... | G06F 21/6218 707/785 |
| 8,195,198 | B1 * | 6/2012 | Shaw ................... | H04W 48/04 455/456.1 |
| 2004/0254934 | A1 * | 12/2004 | Ho ....................... | G06F 21/6218 |
| 2009/0149192 | A1 * | 6/2009 | Vargas ................. | H04W 64/00 455/456.1 |
| 2011/0023128 | A1 * | 1/2011 | Furuya ................ | G06F 21/6218 726/26 |
| 2012/0204235 | A1 * | 8/2012 | Jaudon ................. | G06F 21/604 726/4 |
| 2014/0033326 | A1 * | 1/2014 | Chien ................... | H04W 12/08 726/28 |
| 2014/0208397 | A1 * | 7/2014 | Peterson ............... | G06F 21/51 726/4 |
| 2015/0242644 | A1 * | 8/2015 | Sonasath ............... | G06F 21/88 726/26 |
| 2015/0350215 | A1 * | 12/2015 | Shi ....................... | H04L 63/101 726/26 |
| 2016/0140339 | A1 * | 5/2016 | Xu ....................... | G06F 21/554 726/26 |

(Continued)

*Primary Examiner* — Aravind K Moorthy

(57) ABSTRACT

A method for executing access control over an electronic device includes: detecting a position information of the electronic device with a positioning module; determining whether the electronic device has moved outside an authorized region according to the position information; and disabling a plurality of accessible functions of the electronic device according to a user information when the electronic device has moved outside the authorized region.

18 Claims, 7 Drawing Sheets

(56) References Cited

U.S. PATENT DOCUMENTS

2017/0076100 A1* 3/2017 Buddepalli ........... G06F 21/629
2017/0134896 A1* 5/2017 Kolavennu ........... H04W 4/021

* cited by examiner

ND ELECTRONIC DEVICE CAPABLE OF
EXECUTING ACCESS CONTROL

BACKGROUND OF THE INVENTION

Field of the Invention

The present invention relates to technology of controlling electronic devices and, more particularly, to a method for executing access control over an electronic device and an electronic device capable of executing access control.

Description of the Prior Art

Due to technological advancements, electronic devices are increasingly popular and have a trend toward low weight, small size and high portability. Therefore, electronic device users nowadays are no longer geographically restricted.

Therefore, to allow their employees to work conveniently and efficiently, most enterprises provide their employees with electronic devices, such as notebook computers, tablets, and mobile phones, such that the employees can not only work at their own locations with electronic devices but also bring electronic devices to the other locations to work or hold a discussion.

Although the portability of electronic devices meets employees' working needs and enhances their working efficiency, it increases the chance that unscrupulous employees will bring the electronic devices away from their authorized workplaces stealthily and divulge corporate secrets.

SUMMARY OF THE INVENTION

In view of the aforesaid drawbacks of the prior art, it is an objective of the present invention to provide a method for executing access control over an electronic device and an electronic device capable of executing access control and thus restrict accessible functions of the electronic device outside authorized workplaces, thereby reducing the chance that corporate secrets will be divulged.

In an embodiment, a method for executing access control over an electronic device comprises the steps of: detecting a position information associated with a current location of the electronic device with a positioning module; determining whether the electronic device has moved outside an authorized region according to the position information; and disabling a plurality of accessible functions of the electronic device according to a user information when the electronic device has moved outside an authorized region.

In an embodiment, an electronic device capable of executing access control comprises a user interface, a positioning module and a processing unit. The user interface receives user information. The positioning module detects position information associated with the current location of the electronic device. The processing unit generates a judgment signal according to the position information detected by the positioning module and disables a plurality of accessible functions of the electronic device according to the user information when the judgment signal indicates that the electronic device has moved outside an authorized region.

In conclusion, according to an embodiment of the present invention, a method for executing access control over an electronic device and an electronic device capable of executing access control render it feasible to gain insight into the current location of an electronic device in real time according to the position information related thereto and obtained by a positioning module of the electronic device and disable accessible functions of the electronic device upon confirmation that the electronic device has left an authorized region, thereby preventing divulgence of important information contained in the electronic device.

The fine structures and advantages of the present invention are sufficiently illustrated with embodiments below to allow persons skilled in the art to gain insight into the technical contents of the present invention and implement the present invention accordingly. Furthermore, persons skilled in the art readily understand related objectives and advantages of the present invention by making reference to the disclosure contained in the specification, claims, and drawings of the present invention.

DETAILED DESCRIPTION OF THE EMBODIMENTS

Figure 1:
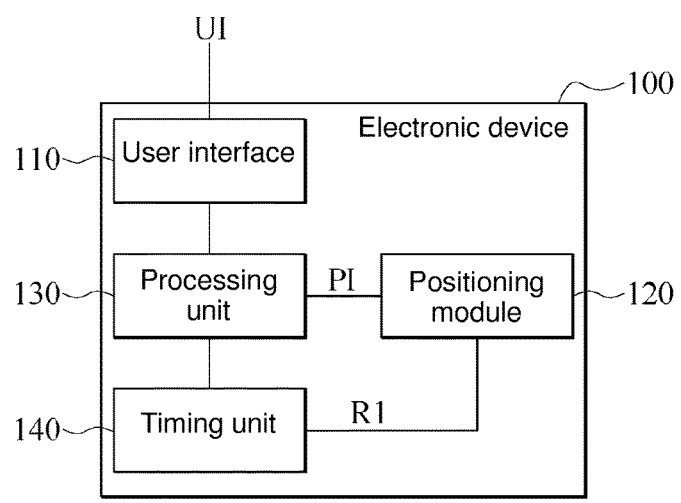
FIG. 1 is a function block diagram of an electronic device capable of executing access control according to an embodiment of the present invention.

FIG. 1 is a function block diagram of an electronic device capable of executing access control according to an embodiment of the present invention. Referring to FIG. 1, an electronic device 100 capable of executing access control comprises a user interface 110, a positioning module 120 and a processing unit 130. The processing unit 130 is coupled to the user interface 110 and the positioning module 120. In some embodiments, the electronic device 100 is a portable electronic device, such as a notebook computer, a tablet or a mobile phone, so as to be easily carried by a user. The user interface 110 is a touchscreen or a keyboard. The processing unit 130 is a System on a Chip (SoC), a central processing unit (CPU) or a microcontroller unit (MCU), but the present invention is not limited thereto.

The user interface 110 serves as a medium for interaction and information exchange between the system of the electronic device 100 and a user. The user interface 110 receives a user information UI entered by the user. The processing unit 130 stores or temporarily stores the user information UI received by the user interface 110 in a storage unit (not shown) of the electronic device 100. The user information UI comprises a login account of the user. In some embodiments, the user information UI further comprises a login password of the user. The login password is a text-based password or a graphical password.

After the electronic device 100 has booted or has been awakened, the processing unit 130 requests the user to enter the user information UI through the user interface 110 to determine whether to start an operating system. Therefore, after the user interface 110 has received the user information UI, the processing unit 130 compares the user information UI with authorized user information pre-stored in a storage unit (not shown) of the electronic device 100 to confirm whether the user is an authorized user. The authorized user information comprises at least one authorized account (and at least one authorized password corresponding thereto.)

If the user information UI does not match the authorized user information and thus confirms that the user is not an authorized user (i.e., is an unauthorized user), the processing unit 130 will neither execute the operating system nor enter an access/operation frame on the electronic device 100, thereby preventing the unauthorized user from operating the electronic device 100.

Conversely, if the user information UI matches the authorized user information and thus confirms that the user is an authorized user, the processing unit 130 will start the operating system and thus enter the access/operation frame on the electronic device 100, thereby allowing the user to operate the electronic device 100. After starting the operating system, the processing unit 130 controls the positioning module 120 to begin operating. The positioning module 120 detects a position information PI associated with the current location of the electronic device 100 and updates the position information PI of the electronic device 100 regularly.

In some embodiments, the positioning module 120 is a global positioning system, such as a global positioning system (GPS), which obtains the position information PI of the electronic device 100 through global positioning signals, or a wireless network module which obtains the position information PI of the electronic device 100 by WiFi positioning principles, or a combination of the global positioning system and the wireless network module. The position information PI includes a two-dimensional coordinate-related message (related to longitude and latitude, for example) or a three-dimensional coordinate-related message (related to longitude, latitude and height.)

Upon confirmation that the user is an authorized user, the processing unit 130 regularly determines whether the electronic device 100 has moved outside an authorized region according to the position information PI currently detected by the positioning module 120 so as to generate a corresponding judgment signal. If the judgment signal indicates that the electronic device 100 has moved outside the authorized region, the processing unit 130 will disable a plurality of accessible functions of the electronic device 100 according to the user information UI.

In some embodiments, a plurality of accessible functions of the electronic device 100 comprises access to a wireless network module, a specific application, a specific folder or a combination thereof.

The aforesaid step of "disabling" a plurality of accessible functions of the electronic device 100 refers to executing control over the authority to access a plurality of accessible functions of the electronic device 100 such that a plurality of accessible functions provided by the electronic device 100 and previously accessible to the user becomes currently no longer accessible to the user in part or in whole. Therefore, the processing unit 130 can change the authority to access a part or the whole of the accessible functions provided by the electronic device 100 according to the judgment signal.

In some embodiments, the electronic device 100 further comprises a timing unit 140. The timing unit 140 is coupled to the processing unit 130 and the positioning module 120. The timing unit 140 counts a restart time. If the restart time calculated by the timing unit 140 reaches a predetermined value, the timing unit 140 will send a restart signal R1 to the positioning module 120 and thereby actuate the positioning module 120 to detect the position information PI associated with the current location of the electronic device 100 again.

Figure 2:
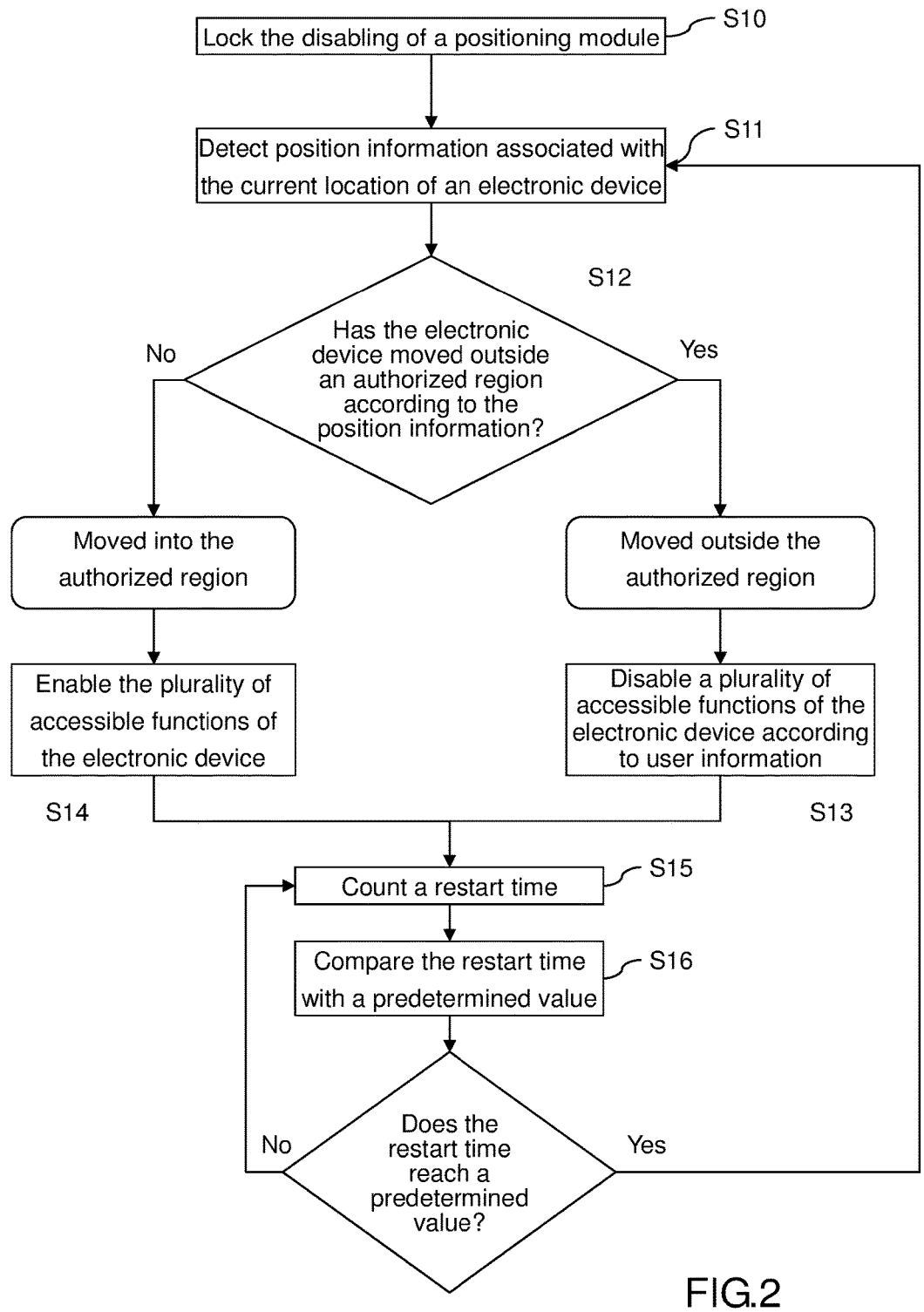
FIG. 2 is a flowchart of a method for executing access control over an electronic device according to an embodiment of the present invention.
Figure 3:
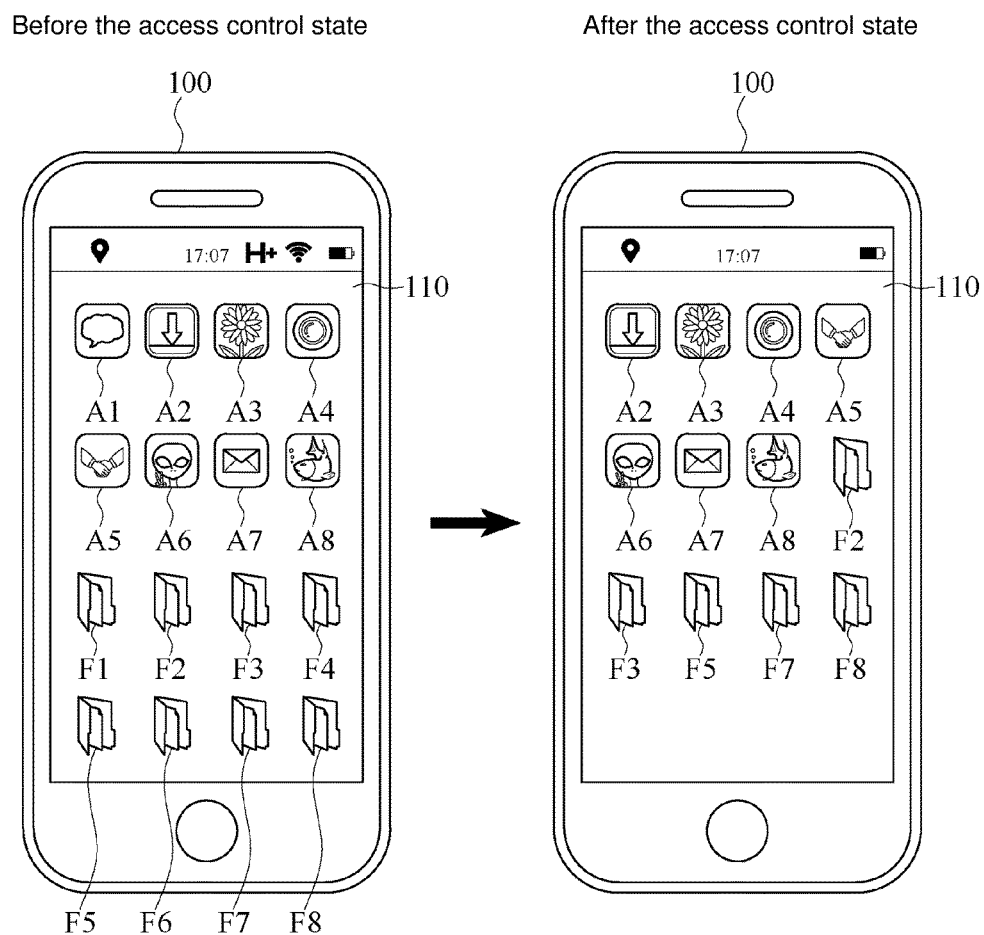
FIG. 3 is a schematic view of an embodiment of the access control state of the electronic device in FIG. 1.
Figure 4:
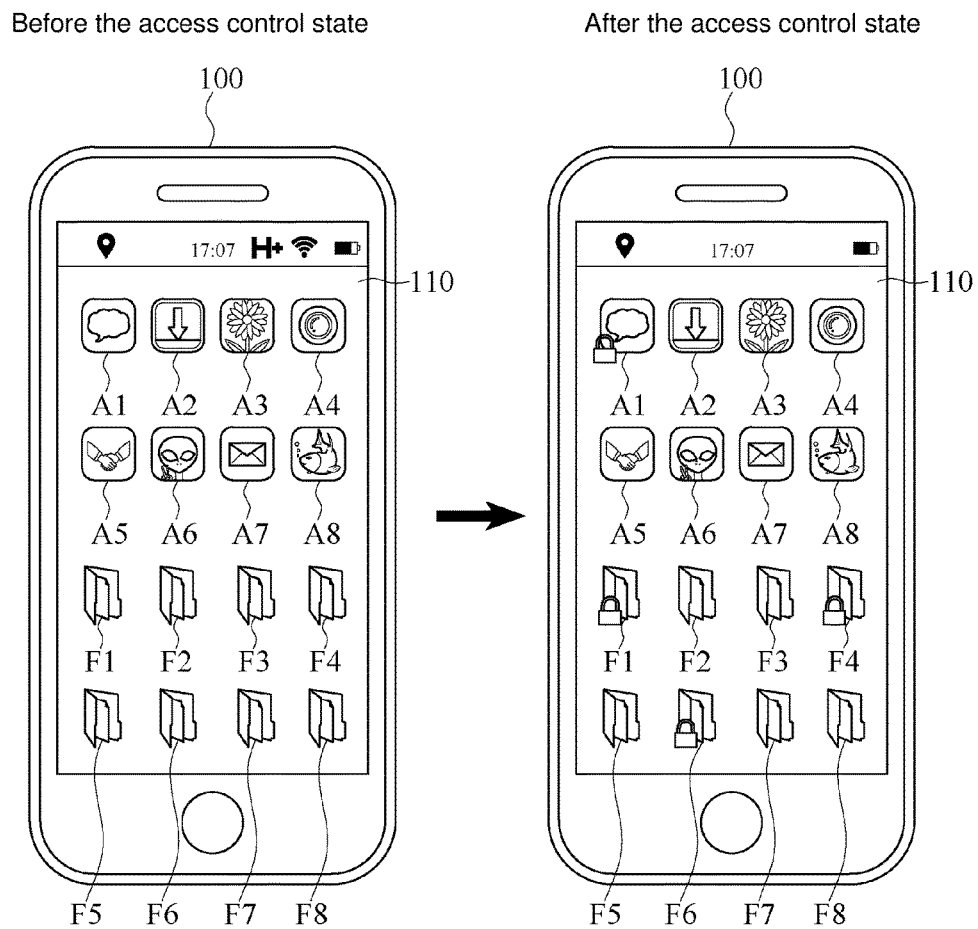
FIG. 4 is a schematic view of another embodiment of the access control state of the electronic device in FIG. 1.

FIG. 2 is a flowchart of a method for executing access control over an electronic device according to an embodiment of the present invention. FIG. 3 is a schematic view of an embodiment of the access control state of the electronic device in FIG. 1. FIG. 4 is a schematic view of another embodiment of the access control state of the electronic device in FIG. 1.

Referring to FIG. 1 through FIG. 4, in an embodiment, the positioning module 120 of the electronic device 100 detects the position information PI associated with the current location of the electronic device 100 (step S11). Afterward, the processing unit 130 of the electronic device 100 determines whether the electronic device 100 has moved outside an authorized region according to the position information PI detected by the positioning module 120 (step S12). If the processing unit 130 determines that the electronic device 100 has moved outside the authorized region, the processing unit 130 will disable a plurality of accessible functions of the electronic device 100 according to the user information UI (step S13) such that the user cannot use the accessible functions outside the authorized region. If the processing unit 130 determines that the electronic device 100 has moved into the authorized region, the processing unit 130 will enable a plurality of accessible functions previously disabled and provided by the electronic device 100 (step S14).

In some embodiments, the processing unit 130 is preconfigured to enable a positioning function of the positioning module 120, because it is possible that the positioning function of the positioning module 120 is disabled by the user to therefore preclude management or surveillance of the authority to access the electronic device 100.

In step S12, the processing unit 130 not only compares the position information PI generated from the positioning module 120 with an authorized region pre-stored in a storage unit (not shown) to confirm whether the location of the electronic device 100 falls within the authorized region and thereby yield a comparison result but also determines whether the electronic device 100 has moved outside the authorized region according to the preceding comparison result and the current comparison result so as to obtain a corresponding judgment signal.

If the preceding comparison result indicates that the electronic device 100 is inside the authorized region and the current comparison result indicates that the electronic device 100 is outside the authorized region, the processing unit 130 can obtain the judgment signal which indicates that the electronic device 100 has moved outside the authorized region. If the preceding comparison result indicates that the electronic device 100 is outside the authorized region and the current comparison result indicates that the electronic device 100 is inside the authorized region, the processing unit 130 can obtain the judgment signal which indicates that the electronic device 100 has moved into the authorized region.

The aforesaid step of "enabling" a plurality of accessible functions of the electronic device 100 refers to loosening control over the authority to access a plurality of accessible functions which is previously disabled. Therefore, if a plurality of accessible functions was previously disabled and thereby inaccessible to the user, the processing unit 130 would open up the authority to access the plurality of accessible functions such that the plurality of accessible functions which was previously disabled becomes currently accessible to the user.

Figure 5:
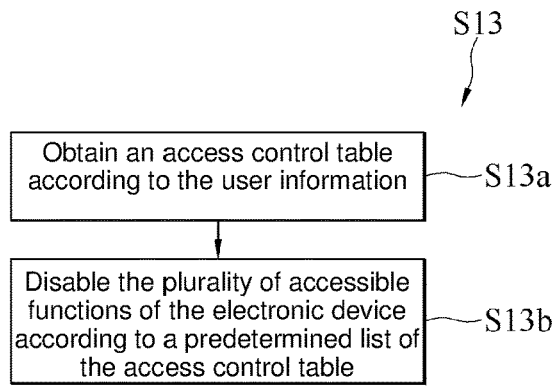
FIG. 5 is a flowchart of an embodiment of step S13 in FIG. 2.

FIG. 5 is a flowchart of an embodiment of step S13 in FIG. 2. Referring to FIG. 1 through FIG. 5, in some embodiments, if the processing unit 130 determines that the electronic device 100 has moved outside the authorized region, the processing unit 130 will fetch from a storage unit (not shown) according to the user information UI (such as a login account) an access control table corresponding to the user information UI (step S13a) and then disable a plurality of accessible functions of the electronic device 100 according to a predetermined list of an access control table (step S13b).

In some embodiments, items shown on the predetermined list comprise a folder, an application, a wireless network module or a combination thereof. In an embodiment of step S13b, the processing unit 130 disables the folder, the application, the wireless network module or a combination thereof, which are installed on the electronic device 100 and listed on the predetermined list, according to the predetermined list of an access control table.

Referring to FIG. 3, take disabling a folder as an example, if the electronic device 100 comprises folders F1-F8 and the predetermined list includes folders F1, F4, F6, the processing unit 130 will change the authority to access folders F1, F4, F6 from the general user authority to the highest user authority according to the items included in the predetermined list, so as to prevent general users from accessing folders F1, F4, F6 but permit folders F2, F3, F5, F7, F8 to be accessible to general users.

In some embodiments, folders F1, F4, F6 placed under control are no longer displayed in a display frame on the electronic device 100. Therefore, the user cannot perceive the presence of folder F1, F4, F6 in the display frame, but the present invention is not limited thereto.

Referring to FIG. 4, in another embodiment, folders F1 through F8 are displayed in the display frame on the electronic device 100, but symbols indicative of lock, control and prohibition are disposed on folders F1, F4, F6 placed under control to indicate that folders F1, F4, F6 are currently inaccessible (or available). Therefore, the user perceives the presence of folders F1, F4, F6 in the display frame but does not use folders F1, F4, F6. Therefore, folders F1, F4, F6 will not be opened even when selected by a user. Furthermore, an alert message pops up in the display frame on the electronic device 100 to notify the user that no access to folders F1, F4, F6 is currently permitted.

Figure 6:
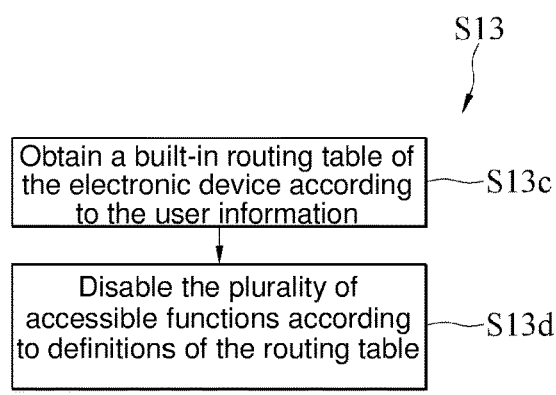
FIG. 6 is a flowchart of another embodiment of step S13 in FIG. 2.

FIG. 6 is a flowchart of another embodiment of step S13 in FIG. 2. Referring to FIG. 1 through FIG. 4, and FIG. 6, in some embodiments, if the processing unit 130 determines that the electronic device 100 has moved outside the authorized region, the processing unit 130 will fetch a built-in routing table of the electronic device 100 from a storage unit (not shown) according to the user information UI (such as a login account) (step S13c) and then disable a plurality of accessible functions of the electronic device 100 according to definitions of the routing table (step S13d).

In some embodiments, the processing unit 130 changes the contents of the routing table such that the user can no longer get connected to a network, thereby executing control over the access to a wireless network module of the electronic device 100. For example, the processing unit 130 changes the subnet mask in the routing table to IP address "0.0.0.0" and thereby disconnects the electronic device 100 from all external network connections. Therefore, even if the user selects any icon shown in the display frame on the electronic device 100 and adapted to start a network connection, the electronic device 100 cannot get connected to any external network.

Figure 7:
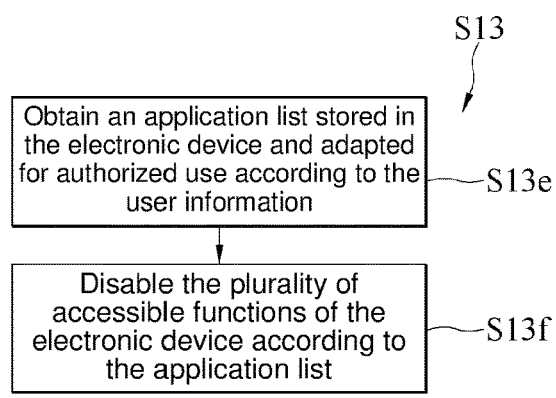
FIG. 7 is a flowchart of yet another embodiment of step S13 in FIG. 2.

FIG. 7 is a flowchart of yet another embodiment of step S13 in FIG. 2. Referring to FIG. 1 through FIG. 4, and FIG. 7, in some embodiments, if the processing unit 130 determines that the electronic device 100 has moved outside the authorized region, the processing unit 130 will fetch from a storage unit (not shown) according to the user information UI (such as a login account) an application list stored in the electronic device 100 and adapted for authorized use (step S13e) and then disable a plurality of accessible functions of the electronic device 100 according to the application list (step S13f).

In some embodiments, the processing unit 130d changes the state of use of applications in the application list such that the user can no longer access the applications, thereby executing control over the access to the applications. For example, in the situation where the electronic device 100 comprises applications A1 through A8 and the application list includes application A1, the processing unit 130 can change the state of use of application A1 from "permitted" to "prohibited" according to the application list, so as to exercise control over the access to application A1.

Referring to FIG. 3, in some embodiments, application A1 placed under control is no longer displayed in the display frame on the electronic device 100. Therefore, the user cannot perceive the presence of application A1 in the display frame, but the present invention is not limited thereto. Referring to FIG. 4, in another embodiment, applications A1 through A8 are displayed in the display frame on the electronic device 100, but symbols indicative of lock, control and prohibition are disposed on application A1 placed under control to indicate that application A1 is currently inaccessible. Therefore, the user can perceive the presence of application A1 in the display frame but cannot access application A1. Therefore, application A1 will not be opened even when selected by the user. Furthermore, an alert message pops up in the display frame on the electronic device 100 to notify the user that no access to application A1 is currently permitted.

Figure 8:
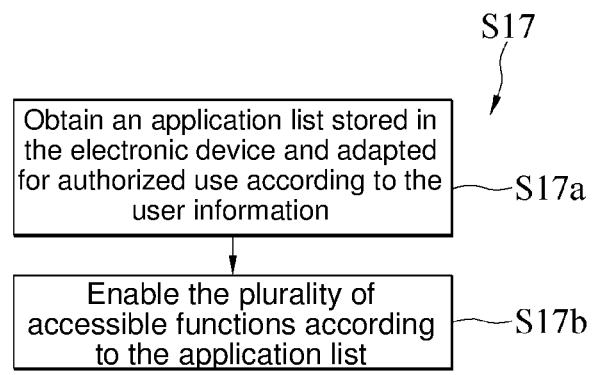
FIG. 8 is a flowchart of an embodiment of step S14 in FIG. 2.
Figure 9:
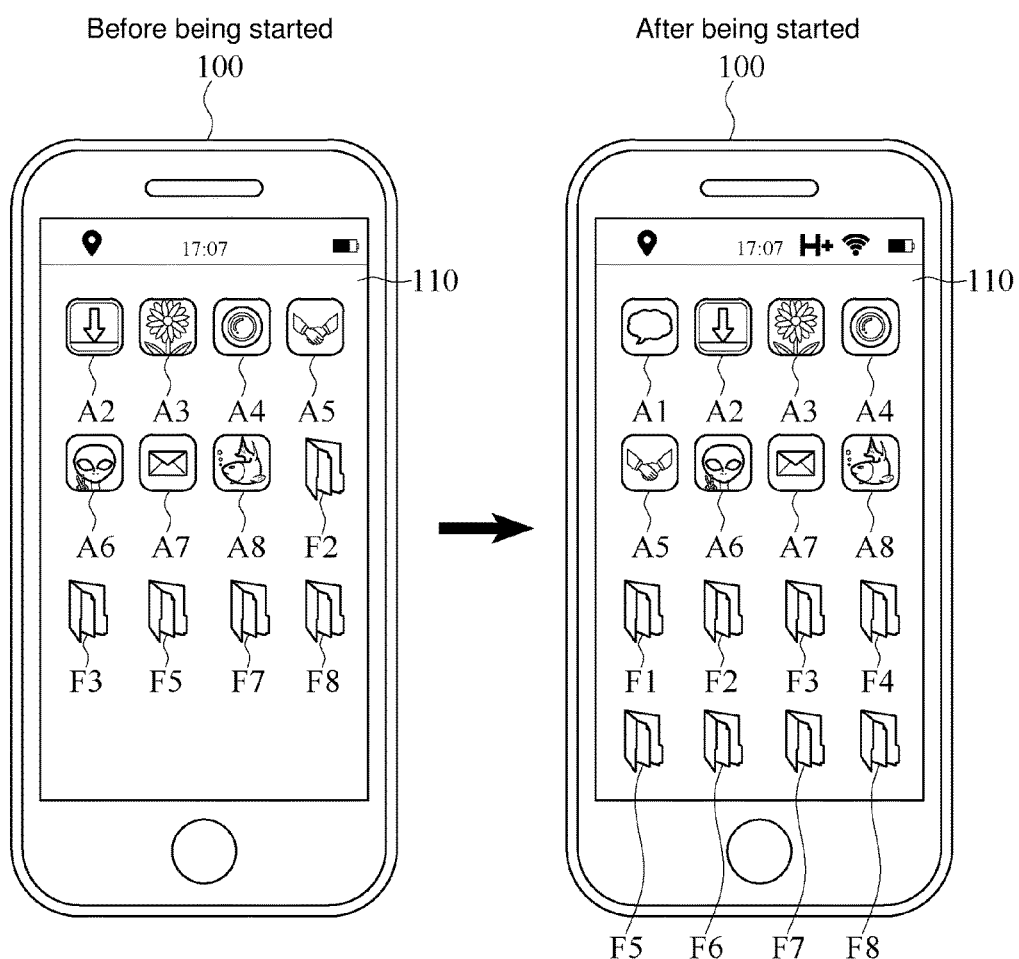
FIG. 9 is a schematic view of an embodiment of disabling the access control state of the electronic device in FIG. 1.

FIG. 8 is a flowchart of an embodiment of step S14 in FIG. 2, whereas FIG. 9 is a schematic view of an embodiment of disabling the access control state of the electronic device in FIG. 1. Referring to FIG. 1, FIG. 2, FIG. 8 and FIG. 9, in some embodiments, if the processing unit 130 determines that the electronic device 100 has moved into the authorized region, the processing unit 130 will fetch from a storage unit (not shown) according to the user information UI (such as a login account) an application list stored in the electronic device 100 and adapted for authorized use (step S14a) and then enable a plurality of accessible functions of the electronic device 100 according to the application list (step S14b). In some embodiments, the processing unit 130d changes the state of use of applications in the application list such that the user can access applications previously disabled, thereby disabling the control over the applications previously disabled. For example, in the situation where the electronic device 100 comprises applications A1 through A8 and the application list includes application A1, the processing unit 130 can change the state of use of application A1 from "prohibited" to "permitted" according to the application list, thereby disabling the control over the access to the application A1. Therefore, after disabling the control, the user can start application A1 by selecting application A1.

The positioning module 120 keeps updating the position information PI of the electronic device 100. The processing unit 130 keeps judging each position information PI generated according to the positioning module 120 to precisely gain insight into the whereabouts of the electronic device 100, but the present invention is not limited thereto. In some embodiments, the positioning module 120 detects the position information PI of the electronic device 100 intermittently to reduce power consumption.

Referring to FIG. 2, in some embodiments, the timing unit 140 counts a restart time (step S15) and compares the restart time with a predetermined value (step S16) to confirm whether the restart time reaches the predetermined value. If the timing unit 140 determines that the restart time thus counted has reached the predetermined value, the timing unit 140 will send the restart signal R1 to the positioning module 120 to execute step S11 again such that the positioning module 120 will begin detecting the position information associated with the current location of the electronic device 100 again and begin another judgment process. Conversely, if the timing unit 140 determines that the restart time has not reached the predetermined value, the process flow of the method of the present invention will go back to step S15 such that the timing unit 140 keeps counting the restart time until it confirms that the restart time has reached the predetermined value, before the process flow of the method of the present invention exits the loop of step S15 and step S16.

In conclusion, a method for executing access control over an electronic device and an electronic device capable of executing access control according to an embodiment of the present invention render it feasible to gain insight into the current location of an electronic device in real time according to the position information related thereto and obtained by a positioning module of the electronic device and disable accessible functions of the electronic device upon confirmation that the electronic device has left an authorized region, thereby preventing divulgence of important information contained in the electronic device.

Although the present invention is disclosed above by preferred embodiments, the preferred embodiments are not restrictive of the present invention. Any persons skilled in the art can make some changes and modifications to the preferred embodiments without departing from the spirit embodied in the present invention. Accordingly, the legal protection for the present invention should be defined by the appended claims.

What is claimed is:

1. A method for executing access control over an electronic device, comprising the steps of:
    detecting a position information associated with a current location of the electronic device with a positioning module;
    determining whether the electronic device has moved outside an authorized region according to the position information; and
    when the electronic device has moved outside the authorized region, disabling a plurality of accessible functions of the electronic device according to a user information and locking the positioning module such that the positioning module cannot be disabled;
    wherein a plurality applications are displayed in a display frame of the electronic device, and the step of disabling the plurality of accessible functions comprises the step of not displaying a subset of the plurality applications according to a predetermined list; and
    wherein a plurality of folders are displayed in the display frame of the electronic device, and the step of disabling the plurality of accessible functions comprises the step of not displaying a subset of the plurality of folders according to the predetermined list.

2. The method for executing access control over an electronic device of claim 1, wherein the step of disabling a plurality of accessible functions of the electronic device according to a user information when the electronic device has moved outside the authorized region comprises the steps of:
    obtaining an access control table according to the user information; and
    disabling the plurality of accessible functions of the electronic device according to a predetermined list of the access control table.

3. The method for executing access control over an electronic device according to claim 2, wherein the plurality of accessible functions comprise access to one of a wireless network module of the electronic device, an application, a folder, and a combination thereof.

4. The method for executing access control over an electronic device according to claim 1, wherein the positioning module is one of a global positioning system, a wireless network module, and a combination thereof.

5. The method for executing access control over an electronic device according to claim 1, further comprising the step of enabling the plurality of accessible functions upon determination that the electronic device has moved into the authorized region.

6. The method for executing access control over an electronic device according to claim 5, wherein the step of determining that the electronic device has moved into the authorized region comprises the steps of:
    obtaining an application list stored in the electronic device and adapted for authorized use according to the user information; and
    enabling the plurality of accessible functions according to the application list.

7. The method for executing access control over an electronic device according to claim 1, wherein the step of determining that the electronic device has moved outside the authorized region comprises the steps of:
    obtaining an application list stored in the electronic device and adapted for authorized use; and
    disabling the plurality of accessible functions according to the application list.

8. The method for executing access control over an electronic device according to claim 1, further comprising the steps of:
    counting a restart time;
    comparing the restart time with a predetermined value; and
    detecting the position information associated with the location of the electronic device with the positioning module again when the restart time reaches the predetermined value.

9. The method for executing access control over an electronic device according to claim 1, wherein the step of determining that the electronic device has moved outside the authorized region comprises the steps of:
    obtaining a built-in routing table of the electronic device; and
    disabling the plurality of accessible functions according to definitions of the routing table.

10. An electronic device capable of executing access control, comprising:
    a user interface for receiving a user information;

a positioning module for detecting a position information associated with a current location of the electronic device; and a processing unit for generating a judgment signal according to the position information, and, when the judgment signal indicates that the electronic device has moved outside an authorized region, disabling a plurality of accessible functions of the electronic device according to the user information and locking the positioning module such that the positioning module cannot be disabled;

wherein a plurality applications are displayed in a display frame of the electronic device, and when the processing unit disables the plurality of accessible functions, a subset of the plurality applications determined according to a predetermined list are not displayed; and wherein a plurality of folders are displayed in the display frame of the electronic device, and the step of disabling the plurality of accessible functions comprises the step of not displaying a subset of the plurality of folders according to the predetermined list.

11. The electronic device capable of executing access control according to claim 10, wherein, if the judgment signal indicates that the electronic device has moved outside the authorized region, the processing unit will obtain an access control table according to the user information and disable the plurality of accessible functions of the electronic device according to a predetermined list of the access control table.

12. The electronic device capable of executing access control according to claim 11, wherein the plurality of accessible functions comprise access to one of a wireless network module, an application, a folder, and a combination thereof.

13. The electronic device capable of executing access control according to claim 10, wherein the positioning module is one of a global positioning system, a wireless network module, and a combination thereof.

14. The electronic device capable of executing access control according to claim 10, further comprising a timing unit for counting a restart time and actuating the positioning module to detect the position information associated with the location of the electronic device again when the restart time reaches a predetermined value.

15. The electronic device capable of executing access control according to claim 10, wherein, if the judgment signal indicates that the electronic device has moved into the authorized region, the processing unit will enable the plurality of accessible functions of the electronic device.

16. The electronic device capable of executing access control according to claim 15, wherein the plurality of accessible functions comprise access to an application of the electronic device, and if the judgment signal indicates that the electronic device has moved into the authorized region, the processing unit will allow access to the application according to an application list corresponding to the user information.

17. The electronic device capable of executing access control according to claim 16, wherein, if the judgment signal indicates that the electronic device has moved outside the authorized region, the processing unit will prohibit access to the application according to the application list corresponding to the user information.

18. The electronic device capable of executing access control according to claim 10, wherein the plurality of accessible functions comprise access to a wireless network module, and if the judgment signal indicates that the electronic device has moved outside the authorized region, the processing unit will obtain a routing table corresponding to the wireless network module according to the user information and disable access to the wireless network module according to definitions of the routing table.

* * * * *